United States Patent
McGee et al.

(10) Patent No.: US 9,388,742 B2
(45) Date of Patent: Jul. 12, 2016

(54) PIVOTING SWIRLER INLET VALVE PLATE

(71) Applicant: Solar Turbines Incorporated, San Diego, CA (US)

(72) Inventors: Georgina J. McGee, San Diego, CA (US); Thomas John Chipman Rogers, San Diego, CA (US); Anthony Fahme, Chula Vista, CA (US); Daniel Paul Panayil, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 476 days.

(21) Appl. No.: 13/889,954

(22) Filed: May 8, 2013

(65) Prior Publication Data

US 2014/0331675 A1    Nov. 13, 2014

(51) Int. Cl.
| | |
|---|---|
| F23R 3/26 | (2006.01) |
| F23R 3/10 | (2006.01) |
| F23R 3/28 | (2006.01) |
| F02C 7/232 | (2006.01) |
| F23R 3/14 | (2006.01) |
| F23C 7/00 | (2006.01) |

(52) U.S. Cl.
CPC . *F02C 7/232* (2013.01); *F23R 3/10* (2013.01); *F23R 3/14* (2013.01); *F23R 3/26* (2013.01); *F23R 3/283* (2013.01); *F23C 7/008* (2013.01); *F23R 3/286* (2013.01)

(58) Field of Classification Search
CPC .............. F23R 3/26; F23R 3/14; F23R 3/28; F23R 3/286; F23R 3/04; F23R 3/10; F23R 3/22; F23R 3/283; F02C 7/14; F02C 7/232; F23C 7/008; F23D 2204/00; F23D 17/002
USPC .................................................. 60/737, 751
See application file for complete search history.

(56) References Cited

U.S. PATENT DOCUMENTS

| | | | | |
|---|---|---|---|---|
| 2,875,580 | A * | 3/1959 | Moy | F23R 3/22 60/749 |
| 3,490,230 | A * | 1/1970 | Suter | F23R 3/26 431/352 |
| 4,527,390 | A * | 7/1985 | Mar | F02K 3/11 60/224 |
| 4,562,698 | A * | 1/1986 | Halvorsen | F23D 11/24 239/412 |
| 5,404,711 | A * | 4/1995 | Rajput | F23D 14/02 239/400 |

(Continued)

FOREIGN PATENT DOCUMENTS

CN           102741516           10/2012

OTHER PUBLICATIONS

Nonpublished U.S. Appl. No. 13/435,827, filed Mar. 30, 2012 in 23 pages.

*Primary Examiner* — Phutthiwat Wongwian
*Assistant Examiner* — Alain Chau
(74) *Attorney, Agent, or Firm* — Procopio, Cory, Hargreaves & Savitch LLP

(57) ABSTRACT

A swirler inlet valve plate for a fuel injector of a gas turbine engine includes a blocker ring and a pivot sleeve mechanically connected to the blocker ring. The blocker ring is formed from at least a portion of a toroid shape. The blocker ring includes a blocking surface perpendicular to an axis of the blocker ring formed from at least a portion of an annulus. The blocker ring also includes a flow surface, an inner circumferential surface of the toroidal shape. The pivot sleeve includes a sleeve portion extending adjacent the blocker ring. The sleeve portion includes a rotation transmission mechanism.

19 Claims, 5 Drawing Sheets

(56) References Cited

U.S. PATENT DOCUMENTS

| | | | | |
|---|---|---|---|---|
| 5,673,552 A | * | 10/1997 | Idleman | F23C 7/004 60/39.23 |
| 5,755,011 A | * | 5/1998 | Green | E05D 7/0027 16/238 |
| 5,826,423 A | | 10/1998 | Lockyer et al. | |
| 5,836,163 A | * | 11/1998 | Lockyer | F23D 11/107 239/405 |
| 5,881,431 A | * | 3/1999 | Pieper, II | E05D 11/06 16/374 |
| 8,136,207 B2 | * | 3/2012 | Ambrose | E05D 3/08 16/277 |
| 8,186,162 B2 | * | 5/2012 | Rogers | F23R 3/286 60/725 |
| 2009/0277176 A1 | | 11/2009 | Caples | |
| 2010/0251719 A1 | | 10/2010 | Mancini et al. | |
| 2012/0324900 A1 | * | 12/2012 | Twardochleb | F23R 3/14 60/772 |
| 2013/0256431 A1 | * | 10/2013 | Wilson | F23R 3/28 239/600 |

* cited by examiner

PIVOTING SWIRLER INLET VALVE PLATE

TECHNICAL FIELD

The present disclosure generally pertains to gas turbine engines, and is more particularly directed toward a removable swirler inlet valve plate of a gas turbine engine fuel injector.

BACKGROUND

Gas turbine engines include compressor, combustor, and turbine sections. The combustor includes fuel injectors that inject liquid and/or gaseous fuel mixed with compressed air into a combustion chamber for combustion. Some fuel injectors include a swirler inlet valve plate to control or limit the amount of compressed air that enters the swirler. One such fuel injector is discussed in U.S. Pat. No. 5,826,423 that discloses a dual fuel premix injector that includes a main air inlet valve plate and a main air inlet valve pivot rod that is axially rotated to open and close the main air inlet valve plate. The main air inlet valve plate includes a plurality of slots radially spaced from the injector central axis at predetermined dimensions.

The present disclosure is directed toward overcoming one or more of the problems discovered by the inventors.

SUMMARY OF THE DISCLOSURE

A swirler inlet valve plate for a fuel injector of a gas turbine engine is disclosed. The swirler inlet valve plate includes a blocker ring and a pivot sleeve mechanically connected to the blocker ring. The blocker ring is formed from at least a portion of a toroid shape. The blocker ring includes a blocking surface perpendicular to an axis of the blocker ring formed from at least a portion of an annulus. The blocker ring also includes a flow surface, an inner circumferential surface of the toroidal shape. The pivot sleeve includes a sleeve portion extending adjacent the blocker ring. The sleeve portion includes a rotation transmission mechanism.

DETAILED DESCRIPTION

The systems and methods disclosed herein include a swirler inlet valve ("SIV") plate assembly. In embodiments, the SIV plate assembly includes a SIV plate with a blocker ring and a pivot sleeve connected to the blocker ring. The SIV plate with a pivot sleeve may facilitate the removal and replacement of the SIV plate from the SIV plate assembly without cutting the SIV plate from the SIV plate assembly and re-welding the SIV plate to the SIV plate assembly; the removal and replacement of the SIV plate with a pivot sleeve from the SIV plate assembly may reduce the time and costs associated with emissions tuning and other maintenance procedures associated with gas turbine engines.

Figure 1:
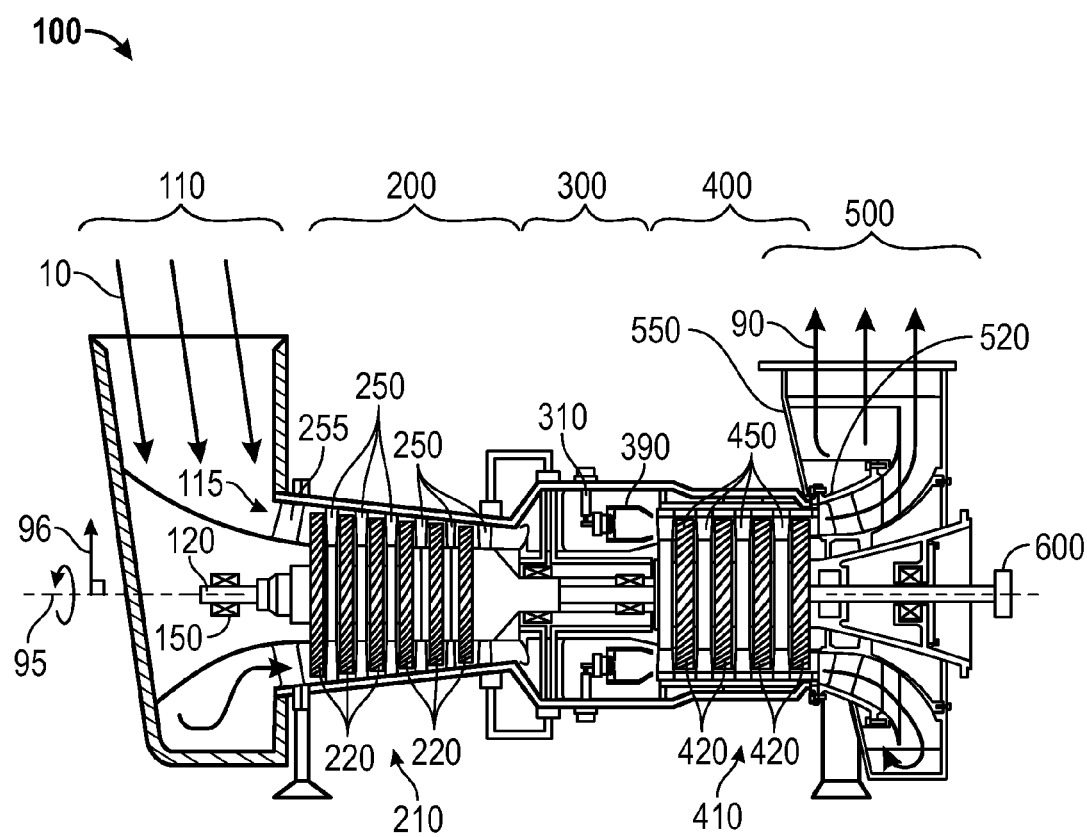
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95. Each fuel injector 310 includes an injector head 315 with a SIV plate assembly 320 at the forward or inlet end of injector head 315.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine section 400 includes multiple turbine stages.

The exhaust 500 includes an exhaust diffuser 520 and an exhaust collector 550.

Figure 2:
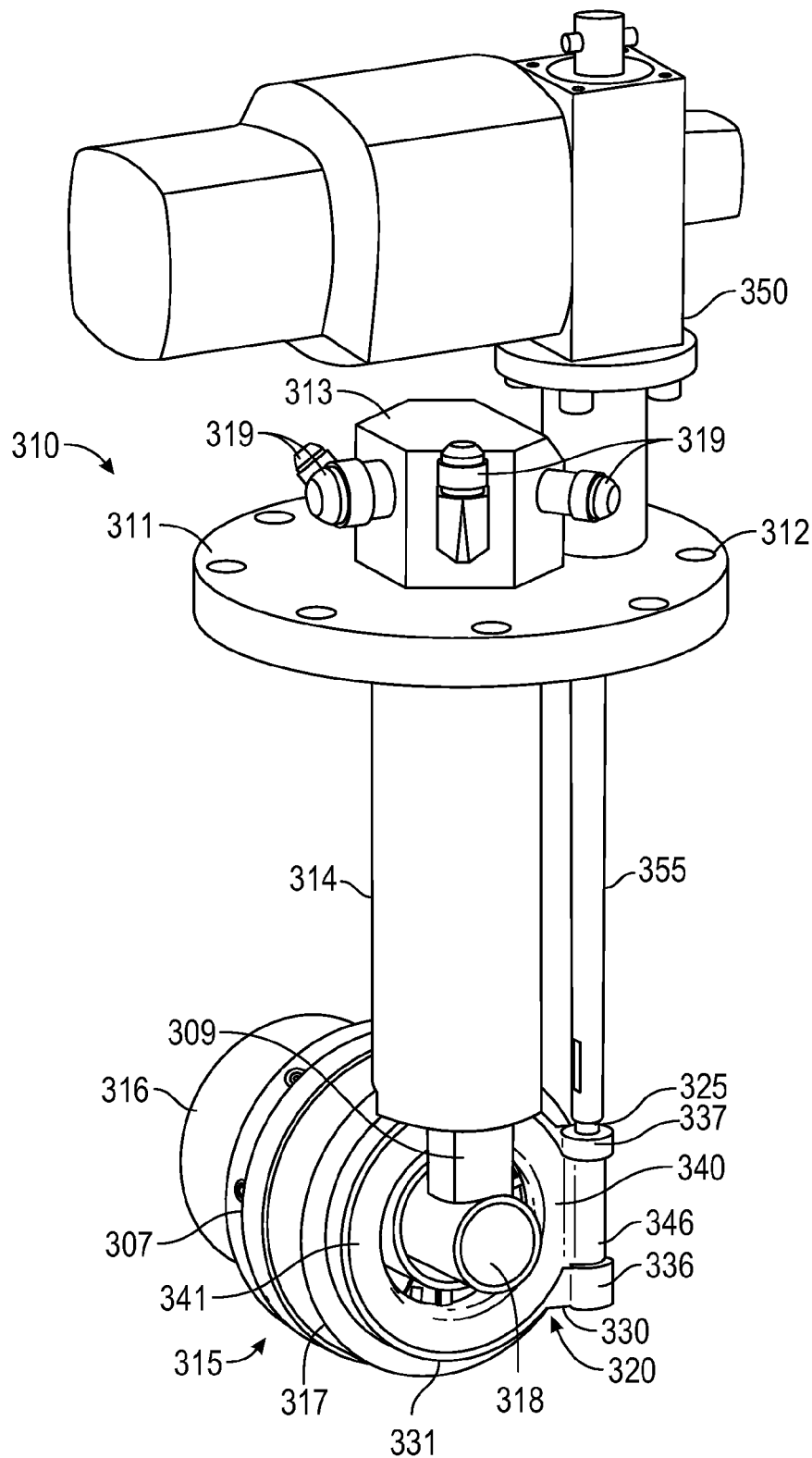
FIG. 2 is a perspective view of a fuel injector of the gas turbine engine of FIG. 1.

FIG. 2 is a perspective view of a fuel injector 310 of the gas turbine engine 100 of FIG. 1. The fuel injector 310 illustrated in FIG. 2 includes a stem bar 314, a flange 311, fitting assembly 313, injector head 315, pilot funnel 318, and SIV plate assembly 320. In the embodiment illustrated, stem bar 314 is a right circular cylinder extending from flange 311 and fitting assembly 313 to injector head 315. Stem bar 314 includes passages extending through the right circular cylinder shape to transfer fuel and/or air from the fitting assembly 313 to the injector head 315. The passages may include a liquid fuel passage, a gas fuel passage, a liquid pilot fuel passage, a gas pilot fuel passage, and an air passage. Other passages may also be included. In other embodiments stem bar 314 may be formed from multiple tubes forming passages or may be formed in a different shape.

In the embodiment illustrated, flange 311 is a disk with multiple bolt holes 312 for securing the fuel injector 310 to the outer case of combustor 300. Stem bar 314 and fitting assembly 313 may be a single machined piece that passes through flange 311. Stem bar 314 may extend in a first direction from flange 311, while fitting assembly 313 may extend in a second direction, opposite the first direction, from flange 311. Flange 311 may be brazed to the single machined piece of stem bar 314 and fitting assembly 313.

Fitting assembly 313 is in the shape of a hexagonal prism in the embodiment illustrated. Each rectangular side of the hexagonal prism may include one or more fittings 319. In other embodiments fitting assembly 313 may be other shapes including prisms, cylinders, or irregular shapes. Fittings 319 may also be attached to the top base of the prism or cylinder.

SIV plate assembly 320 includes SIV housing 330, SIV plate 340, and pivot pin 325. SIV housing 330 includes housing ring 331, base knuckle 336, and guide knuckle 337. Housing ring 331 may be a solid the shape of at least a portion of a toroid. In some of the embodiments, a slice or portion of the toroid is removed to form a 'C' shape. In one embodiment, the 'C' shape is formed with a horizontal segment of a toroid where the solid defining the 'C' shape is cut from the toroid by a plane oriented parallel to the axis of symmetry of the toroid. Shapes such as a rectangle, an 'L' shaped curve, or a wedge may be used for the closed plane curve used to form the toroidal shape.

Base knuckle 336 is adjacent to housing ring 331 and may extend from housing ring 331. In embodiments with a 'C' shaped housing ring 331, base knuckle 336 may be adjacent housing ring 331 in a quadrant next to the quadrant containing the opening for the 'C' shape. The base knuckle 336 may have a hollow cylinder shape that includes a circular slot for pivot pin 325. Guide knuckle 337 is also adjacent housing ring 331 and may also extend from housing ring 331. Guide knuckle 337 may be offset from base knuckle 336 and may be between base knuckle 336 and the end of the 'C' shape proximal to the base knuckle 336. Guide knuckle 337 may also have a hollow cylinder shape that includes a circular slot for pivot pin 325. Base knuckle 336 and guide knuckle 337 may be aligned and configured to receive pivot pin 325.

SIV plate 340 is configured to block a portion of the swirler primary air inlet. SIV plate 340 includes blocker ring 341 and pivot sleeve 346. SIV plate 340 including blocker ring 341 and pivot sleeve 346 may be formed as a single piece of material, metallurgically bonded, or otherwise connected or joined. Blocker ring 341 is a solid the shape of at least a portion of a toroid. In some of those embodiments, a slice or portion of the toroid is removed to form a 'C' shape. In one embodiment, the 'C' shape is formed with a horizontal segment of a toroid. Shapes such as a rectangle, an 'L' shaped curve, or a wedge may be used for the closed plane curve used to form the toroidal shape. Blocker ring 341 may be sized to fit within housing ring 331. The inner portion of housing ring 331 may be a negative of the outer portion of blocker ring 341.

Pivot sleeve 346 may be located adjacent blocker ring 341. In some embodiments, pivot sleeve 346 is in a quadrant next to the quadrant containing the opening for the 'C' shape. Pivot sleeve 346 includes sleeve portion 349 and pivot pin opening 348 (shown in FIG. 5). Sleeve portion 349 may be oriented tangent to blocker ring 341. Sleeve portion 349 includes a rotation transmission mechanism configured to transmit the rotation or rotational motion of pivot pin 325 to SW plate 340 and blocker ring 341. The rotation transmission mechanism may be a spline, a keyed hole, an opening with a polygonal prism shape matching a shape of pivot pin 325, an interference fit between the pivot pin opening 348 and pivot pin 325, or other similar mechanisms.

Pivot sleeve 346 is configured to be between base knuckle 336 and guide knuckle 337, and align with base knuckle 336 and guide knuckle 337 within SIV plate assembly 320. In the embodiment illustrated, pivot pin 325 is configured to be inserted through base knuckle 336, pivot sleeve 346, and guide knuckle 337, forming a hinge. Pivot pin 325 is also configured to mate with and couple to an actuator shaft 355 extending from an actuator assembly 350, through flange 311 and to pivot pin 325.

Gas gallery 317 may be a hollow cylinder, with a portion of the hollow cylinder connecting to stem bar 314 distal to flange 311. Gas gallery 317 may be brazed or welded to stem bar 314. In other embodiments, gas gallery 317 is an annular ring, or a cylindrical tube. Injector head 315 may extend perpendicular to stem bar 314 and may be coupled to gas gallery 317. In other embodiments injector head 315 may form an acute angle with stem bar 314 or may be aligned with stem bar 314. SIV housing 330 may connect to gas gallery 317 or injector head 315 with a press or interference fit, or may be brazed or welded to gas gallery 317 or injector head 315.

Figure 4:
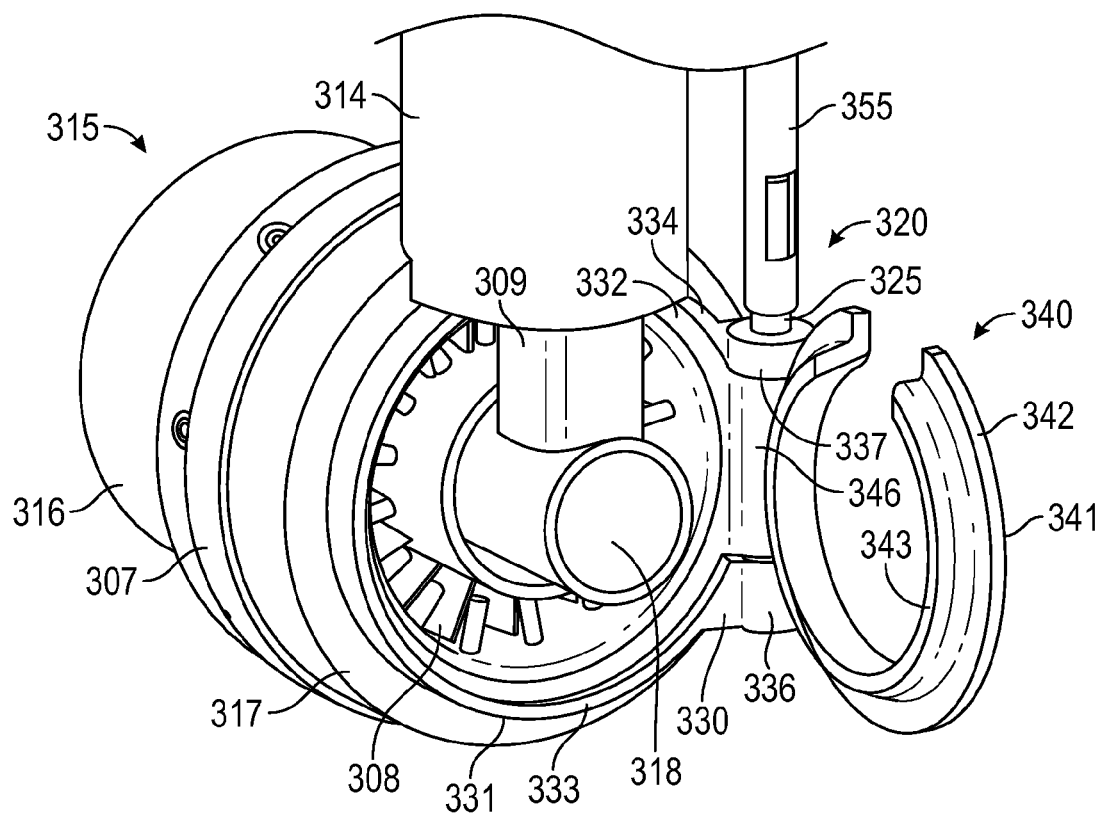
FIG. 4 is a perspective view of a portion of the fuel injector of FIG. 2.

Injector head 315 may include injector body 307, barrel 316, a swirler (not shown), and swirler inlet vanes 308 (shown in FIG. 4). Injector body 307 may be a hollow cylinder shape. Injector body 307 may be brazed, welded, or otherwise connected to gas gallery 317. Injector body 307 may be axially aligned with gas gallery 317. Barrel 316 may also be axially aligned with gas gallery 317. Barrel 316 may be a hollow cylinder extending from injector body 307. Barrel 316 may be brazed, welded, bolted, or otherwise connected to injector body 307. When installed in gas turbine engine 100, the end of barrel 316 distal to injector body 307 is adjacent combustion chamber 390 (shown in FIG. 1).

The swirler extends through the injector head 315. Injector body 307 and barrel 316 may include portions of the swirler. In the embodiment illustrated, the primary air inlet to the swirler is located at gas gallery 317, while the outlet of the swirled fuel and air mixture is located at the end of barrel 316, adjacent combustion chamber 390. Swirler inlet vanes 308 may be located at the primary air inlet of the swirler (shown in FIG. 4), radially inward from gas gallery 317 relative to the axis of gas gallery 317. Swirler inlet vanes 308 may be integral to or otherwise connected to injector body 307.

Pilot funnel 318 is a cylindrical body coaxial to injector head 315; pilot funnel 318 may be configured to direct pilot fuel to or near the axis of injector head 315. Pilot funnel 318 may extend from within the inlet of injector head 315, the primary air inlet of the swirler, axially in the direction away from barrel 316. Strut 309 extends from the end of stem bar 314 distal to flange 311 to pilot funnel 318 across the primary air inlet of the swirler. The opening of the 'C' shape of SIV housing 330 and SIV plate 340 may be sized to fit strut 309. Pilot funnel 318, strut 309 and stem bar 314 may be brazed or welded together. In one embodiment, flange 311, fitting assembly 313, stem bar 314, pilot funnel 318, strut 309, and gas gallery 317 are a single integral forged and machined piece rather than separate pieces brazed or welded together.

Figure 3:
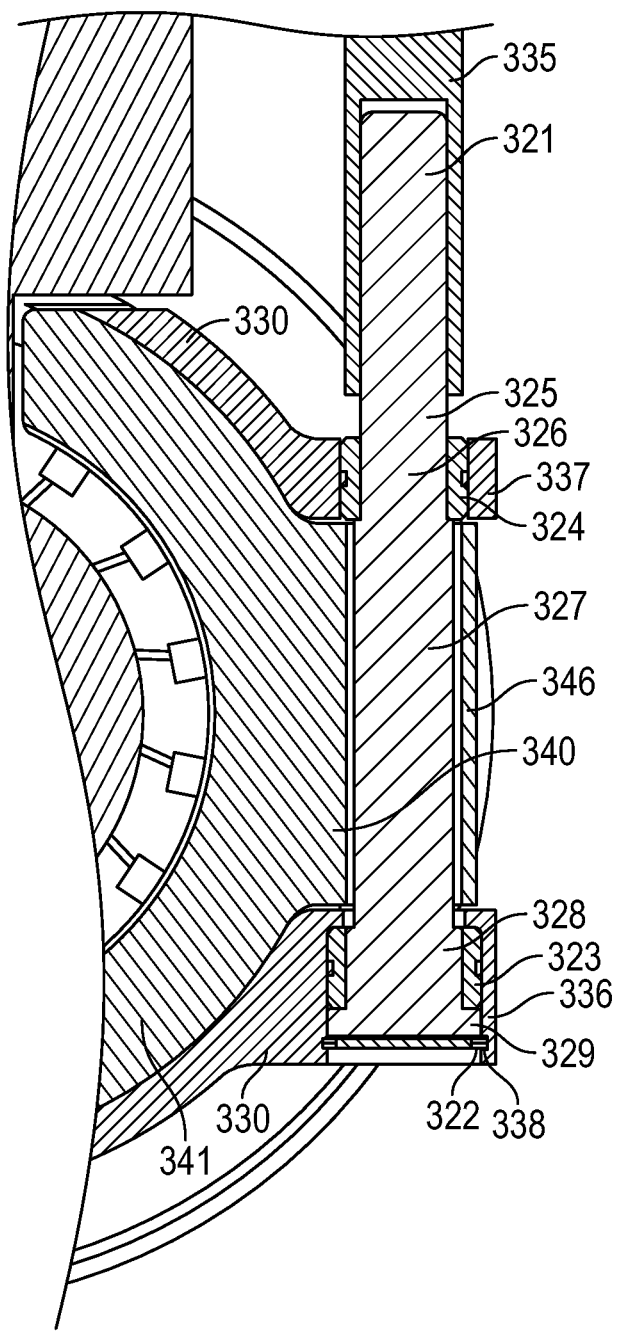
FIG. 3 is a cross-sectional view of a portion of the swirler inlet valve plate assembly of FIG. 2.

FIG. 3 is a cross-sectional view of a portion of the SIV plate assembly 320 of FIG. 2. In the embodiment illustrated, pivot pin 325 includes a base portion 328, a pivot portion 327, a guide portion 326, and a coupling portion 321. The base portion 328 and the guide portion 326 are configured and sized to fit within and align with base knuckle 336 and guide knuckle 337 respectively and are configured to allow relative rotation between pivot pin 325 and base knuckle 336, and pivot pin 325 and guide knuckle 337. The base portion 328 may include a head portion 329. The head portion 329 may be at an end of pivot pin 325.

The pivot portion 327 is configured and sized to mate with pivot pin opening 348. The pivot portion 327 cross-sectional shape (perpendicular to the cross-section shown) may match the cross-sectional shape (perpendicular to the cross-section shown) of pivot pin opening 348. The pivot portion 327 may have a polygon or regular polygon cross-sectional shape. In one embodiment, the pivot portion 327 cross-section is a square with rounded corners.

The coupling portion 321 is configured to mate with and couple to actuator shaft 355. Like pivot portion 327, coupling portion 321 may have a polygon or regular polygon cross-sectional shape configured to be inserted into a mating hole of actuator shaft 355 with a similarly shaped cross-section. Conversely, coupling portion 321 may include a mating hole configured to receive a portion of actuator shaft 355. A spline, a keyed hole, an interference fit between the coupling portion 321 and the actuator shaft 355, or other similar mechanisms may also be used.

A retaining mechanism may be used to hold pivot pin 325 within SIV plate assembly 320. In the embodiment illustrated, base knuckle 336 includes a retaining slot 338. A retaining ring 322 is inserted into the retaining slot 337 adjacent the head portion 329 to hold pivot pin 325 in place. In another embodiment, an internal portion of base knuckle 336 is threaded. A threaded plug is threaded into base knuckle 336 adjacent the head portion 329 to hold pivot pin 325 in place.

SIV plate assembly 320 may also include a base bushing 323 and a guide bushing 324. Base bushing 323 may align with and be between base knuckle 336 and base portion 328. Guide bushing 324 may align with and be located between guide knuckle 337 and guide portion 326. Base busing 323 and guide bushing 324 are configured to allow relative rotation between base knuckle 336 and base portion 328, and guide knuckle 337 and guide portion 326.

FIG. 4 is a perspective view of a portion of the fuel injector 310 of FIG. 2 with the SIV plate 340 in the open position. Referring to FIG. 4, housing ring 331 includes housing annular portion 332 in the embodiment illustrated. Housing annular portion 332 may be a 'C' shaped horizontal segment of an annular disk, where the solid defining the 'C' shape is cut from the annular disk by a plane oriented parallel to the axis of symmetry of the annular disk.

Housing ring 331 may also include a first housing cylindrical portion 333 and a second housing cylindrical portion 334. First housing cylindrical portion 333 extends from the radially outer section of housing annular portion 332 in a first or forward axial direction between base knuckle 336 and the end of the 'C' shape distal to the base knuckle 336. Second housing cylindrical portion 334 extends from the radially outer section of housing annular portion 332 in the first axial direction between guide knuckle 337 and the end of the 'C' shape proximal to the base knuckle 336. First housing cylindrical portion 333 and second housing cylindrical portion 334 may be hollow cylinder segments and may form an 'L' shaped cross-section with housing annular portion 332.

Blocker ring 341 may include blocker annular portion 342 and blocker cylindrical portion 343. Blocker annular portion 342 may be an annular disk. Blocker cylindrical portion 343 extends in a second or aft axial direction from the radially inner section of blocker annular portion 342. Blocker cylindrical portion 343 may be a segment of a hollow cylinder and may form an 'L' shaped cross-section with blocker annular portion 342.

The 'L' shaped cross-section of blocker ring 341 may fit within the 'L' shaped cross-section of housing ring 331. When SIV plate 340 is in the closed position, as illustrated in FIG. 2, blocker annular portion 342 may be located radially inward from first housing cylindrical portion 333 and second housing cylindrical portion 334, and located axially forward of housing annular portion 332. Blocker cylindrical portion 343 may be located radially inward from housing annular portion 332. In some embodiments, the inner portion of housing ring 331 is a negative of the outer portion of blocker ring 341.

Figure 5:
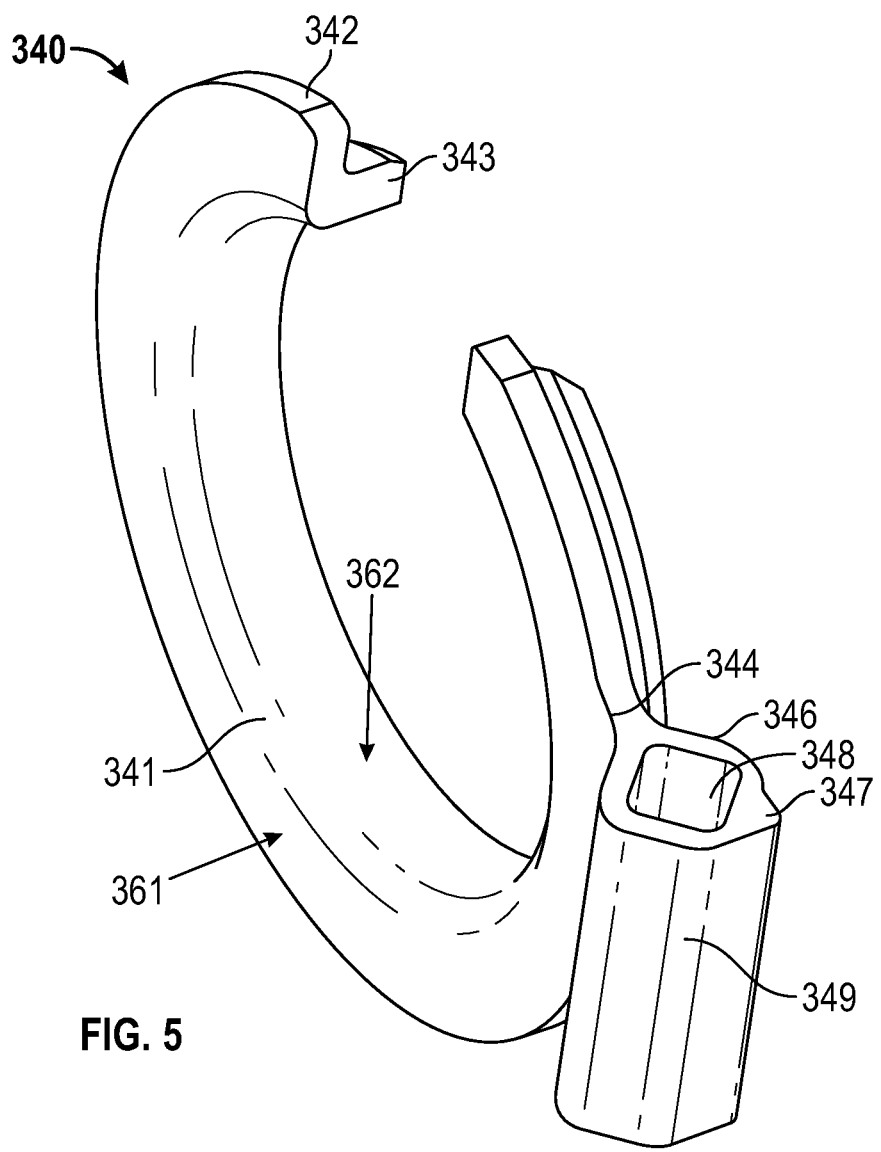
FIG. 5 is a perspective view of the swirler inlet valve plate of FIGS. 2, 3 and 4.

FIG. 5 is a perspective view of the SIV plate 340 of FIGS. 2 and 3. Referring to FIG. 5, blocker ring 341 may include blocking surface 361 and flow surface 362. Blocking surface 361 may be at least a portion of an annulus facing in the axial direction. Flow surface 362 may be at least a portion of a cylinder and may be the inner circumferential surface of blocker ring 341. In the embodiment illustrated, blocking surface 361 is the annular face of blocker annular portion 342, opposite or distal to blocker cylindrical portion 343, and flow surface 362 is the inner circumferential surface of blocker cylindrical portion 343. Blocking surface 361 and flow surface 362 are adjacent surfaces and may form a right angle. In some embodiments, the edge between blocking surface 361 and flow surface 362 is rounded.

In some embodiments, sleeve portion 349 may have a tubular shape. Pivot sleeve 346 may be configured to include pivot pin opening 348 extending into or through sleeve portion 349 to form the rotation transmission mechanism. In the embodiment illustrated, pivot sleeve 346 is a square tube with rounded edges.

Pivot pin opening 348 is configured to mate with pivot pin 325 so that SIV plate 340 rotates with pivot pin 325 about the axis of pivot pin 325 when pivot pin 325 is rotated. Pivot pin opening 348 may include a prism shape with a polygonal cross-section. In the embodiment illustrated, pivot pin opening 348 includes a square cross-section. In other embodiments, the cross-section of pivot pin opening 348 is formed from other regular polygons, such as a regular pentagon, a regular hexagon, or a regular octagon. The corners of the polygonal cross-section may be rounded.

Pivot sleeve 346 may also include a limiter 347. The limiter 347 is configured to limit the rotation of SIV plate 340 to a predetermined amount during operation of the fuel injector 310. Limiter 347 may protrude from sleeve portion 349 with a triangular cross-section and extend along the tube shape of sleeve portion 349. Limiter 347 is configured to limit the rotation of SIV plate 340 to approximately ninety degrees. Limiter 347 may be configured to contact a portion of SIV housing 330, gas gallery 317, or any portion or extension of injector head 315 or fuel injector 310.

SIV plate 340 may include sleeve neck 344 extending between and connecting blocker ring 341 and pivot sleeve 346.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, alloy x, INCONEL, WASPALOY, RENE alloys, HAYNES alloys, alloy 188, alloy 230, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused. A portion of air 10 is directed into injector head 315 at the primary air inlet to the swirler. The portion of air 10 is swirled and mixed with fuel injected into the swirler.

The mixed air 10 and fuel are injected into the combustion chamber 390 via fuel injector 310 and combusted. Energy is extracted from the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

During operation of the gas turbine engine 100 the amount of air entering the injector head 315 and the swirler may need to be limited to improve efficiency or reduce emissions. A flow restrictor such as SIV plate 340 may be placed at the primary air inlet of the swirler to limit or reduce the airflow into the swirler.

During certain operations of the gas turbine engine 100, the airflow into the swirler may need to be decreased to maintain flame stability, for example when transferring from a liquid to a gaseous fuel. The airflow may also need to be different when using a gaseous fuel than when using a liquid fuel. SIV plate assembly 320 may be used with an actuator to rotate SIV plate 340 between a closed or blocking position as illustrated in FIG. 2 and an open position as illustrated in FIG. 3, allowing the airflow into injector head 315 to be changed during operation of the gas turbine engine 100.

Environmental conditions may affect the amount of airflow entering the swirler to be restricted during operation of the gas turbine engine 100. The radial thickness of blocker ring 341 and the surface area of blocking surface 361 may vary. A blocker ring 341 with a first radial thickness and a first surface area of blocking surface 361 may be removed and replaced by a blocker ring 341 with a second radial thickness and a second surface area of blocking surface 361. This may be performed during emissions tuning or other gas turbine engine 100 maintenance operations.

Referring to FIG. 3, pivot sleeve 346 in conjunction with pivot pin 325 held in place by a retaining ring 322, threaded plug, or other retaining mechanism may facilitate the removal and replacement of blocker rings 341 without the need to cut SIV plate 340 from SIV plate assembly 320 and without the need to re-weld SIV plate 340 to SIV plate assembly 320, which may reduce the time and cost of emissions tuning and other gas turbine engine maintenance operations. In the embodiment illustrated, SIV plate 340 may be removed and replaced by decoupling pivot pin 325 from the SIV plate assembly 320 by removing retaining ring 322 from retaining slot 338 and then removing pivot pin 325. The same or a SIV plate 340 with a different sized blocking surface 361 may then be coupled to SIV plate assembly 320 by inserting pivot pin 325 into base knuckle 336, pivot sleeve 346, and guide knuckle 337 and inserting a retaining mechanism, such as retaining ring 322, into base knuckle 337 adjacent head portion 329.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular SIV plate assembly, it will be appreciated that the SIV plate assembly in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A swirler inlet valve plate for a fuel injector of a gas turbine engine, the swirler inlet valve plate comprising:
    a blocker ring of the fuel injector formed from at least a portion of a toroid shape, the blocker ring including
        a blocking surface perpendicular to an axis of the blocker ring formed from at least a portion of an annulus, and
        a flow surface being an inner circumferential surface of the toroidal shape; and
    a pivot sleeve connected to the blocker ring, the pivot sleeve including
        a sleeve portion extending adjacent the blocker ring along the length of the pivot sleeve, the sleeve portion including a rotation transmission mechanism;
        a pivot pin opening having a polygon-shaped cross section sized to receive a pivot pin, the pivot pin having a portion sized corresponding to the pivot pin opening; and
        a pivot pin retaining mechanism operable to secure the sleeve portion to the pivot pin and allow interchangeability of the blocker ring.

2. The swirler inlet valve plate of claim 1, wherein the rotation transmission mechanism is the pivot pin opening extending through the sleeve portion.

3. The swirler inlet valve plate of claim 2, wherein the pivot pin opening further comprises a spline.

4. The swirler inlet valve plate of claim 1, wherein the sleeve portion is a tube.

5. The swirler inlet valve plate of claim 1, wherein the pivot pin retaining mechanism is a retainer ring, the retainer ring operable to secure the blocker ring to the pivot pin.

6. The swirler inlet valve plate of claim 1, wherein the portion of the toroid shape forms a 'C' about the axis of the blocker ring.

7. The swirler inlet valve plate of claim 1, wherein the blocker ring and the pivot sleeve are formed as a single piece of material.

8. The swirler inlet valve plate of claim 1, wherein the blocker ring and the pivot sleeve are metallurgically bonded as a single piece of material.

9. The swirler inlet valve plate of claim 1, wherein the pivot sleeve includes a limiter disposed opposite the blocker ring and extending along the sleeve portion and extending away from the sleeve portion to limit rotation of the swirler inlet valve plate to a predetermined amount.

10. A swirler inlet valve plate assembly for a fuel injector of a gas turbine engine, the swirler inlet valve plate assembly comprising:
   the swirler inlet valve plate of claim 1;
   a swirler inlet valve housing including
      a housing ring formed from at least a portion of a second toroid shape sized to receive the swirler inlet valve plate,
      a base knuckle adjacent the housing ring, and
      a guide knuckle axially aligned and offset from the base knuckle;
   a pivot pin including
      a base portion shaped to rotate relative to the base knuckle,
      a pivot portion shaped to transfer rotational motion to the swirler inlet valve plate through the pivot sleeve, and
      a guide portion shaped to rotate relative to the guide knuckle;
   wherein the pivot sleeve is between and aligns with the base knuckle and the guide knuckle, and the pivot pin inserts into the base knuckle, the pivot sleeve, and the guide knuckle to form a hinge.

11. A swirler inlet valve plate for a fuel injector of a gas turbine engine, the swirler inlet valve plate comprising:
   a blocker ring of the fuel injector including a blocking surface perpendicular to an axis of the blocker ring formed from at least a portion of an annulus, the blocking surface configured to reduce airflow into an injector head of the fuel injector; and
   a pivot sleeve joined to the blocker ring, the pivot sleeve including
      a sleeve portion extending adjacent the blocker ring along the length of the pivot sleeve, the sleeve portion being configured to couple with a pivot pin and transfer rotation of the pivot pin to the blocker ring;
      a pivot pin opening having a polygon-shaped cross section sized to receive a pivot pin, the pivot pin having a portion sized corresponding to the pivot pin opening; and
      a pivot pin retaining mechanism operable to secure the sleeve portion to the pivot pin and allow interchangeability of the blocker ring.

12. The swirler inlet valve plate of claim 11, wherein the swirler inlet valve plate is removable from a swirler inlet valve plate assembly by decoupling a pivot pin from the swirler inlet valve plate assembly via the pivot pin retaining mechanism.

13. The swirler inlet valve plate of claim 11, wherein the pivot sleeve includes a limiter disposed opposite the blocker ring and extending along the sleeve portion and configured to limit a rotation of the blocker ring to a predetermined amount.

14. A swirler inlet valve plate assembly for a fuel injector of a gas turbine engine, the swirler inlet valve plate assembly comprising:
   the swirler inlet valve plate of claim 11;
   a swirler inlet valve housing including
      a housing ring configured to receive the swirler inlet valve plate, a radially inner portion of the housing ring being a negative of the shape of a radially outer portion of the swirler inlet valve plate,
      a base knuckle adjacent the housing ring, and
      a guide knuckle axially aligned and offset from the base knuckle;
   a pivot pin configured to secure the swirler inlet valve plate to the swirler inlet valve assembly, the pivot pin including
      a base portion configured to rotate relative to the base knuckle,
      a pivot portion configured to transfer rotational motion to the swirler inlet valve plate through the pivot sleeve,
      a guide portion configured to rotate relative to the guide knuckle, and
      a coupling portion distal to the base portion configured to couple to an actuator shaft.

15. The swirler inlet valve plate assembly of claim 14, further comprising a threaded plug threaded into the base knuckle and configured to retain the pivot pin in the swirler inlet valve plate assembly.

16. A swirler inlet valve plate for a fuel injector of a gas turbine engine, the swirler inlet valve plate comprising:
   a blocker ring of the fuel injector including
      a blocker annular portion including a 'C' shaped annular disk, and
      a blocker cylindrical portion including a 'C' shaped hollow cylinder extending axially from the blocker annular portion forming an 'L' shaped cross-section; and
   a pivot sleeve adjacent and connected to the blocker ring, the pivot sleeve including a sleeve portion having a tube shape, and
      a pivot pin opening extending through the tube shape, the pivot pin opening including a regular polygon cross-sectional shape configured to transfer rotation of a pivot pin to the blocker ring, the pivot pin having a portion sized corresponding to the pivot pin opening: and
      a pivot pin retaining mechanism operable to secure the sleeve portion to the pivot pin and allow interchangeability of the blocker ring.

17. The swirler inlet valve plate of claim 16, wherein the pivot sleeve includes a limiter protruding from the sleeve portion with a triangular cross-section extending along the tube shape of the sleeve portion.

18. A swirler inlet valve plate assembly for a fuel injector of a gas turbine engine, the swirler inlet valve plate assembly comprising:
   the swirler inlet valve plate of claim 16;
   a swirler inlet valve housing including
      a base knuckle adjacent the pivot sleeve, the base knuckle including a hollow cylinder shape,
      a guide knuckle axially aligned and offset from the base knuckle and adjacent the pivot sleeve, the guide knuckle including a second hollow cylinder shape,
      wherein the pivot sleeve is located between the base knuckle and the guide knuckle, and
      a housing ring including,
         a housing annular portion connected to the base knuckle and the guide knuckle, the housing annular portion being a 'C' shaped horizontal segment of an annular disk, wherein the guide knuckle is located between the base knuckle and a first end of the 'C' shape proximal to the base knuckle a first housing cylindrical portion extending from a radially outer section of housing annular portion between a second end of the 'C' shape distal to the base knuckle and the base knuckle, and a second housing cylindrical portion extending from a radially outer section of housing annular portion between the first end and the guide knuckle, wherein the housing annular portion is located radially outward from and axially aligned with the blocker cylindrical portion when the swirler inlet valve plate is in a closed position, and the first housing cylindrical portion and the second housing cylindrical portion are located radially outward from and axially aligned with the blocker annular portion when the swirler inlet valve plate is in the closed position;

a pivot pin including
 a base portion aligned with the base knuckle, the base portion being a cylindrical shape,
 a pivot portion aligned with the pivot sleeve, the pivot portion being configured with a cross-sectional shape matching the cross-sectional shape of the pivot pin opening, and
 a guide portion aligned with the guide knuckle, the guide portion being a cylindrical shape;
a base bushing located between the base portion and the base knuckle; and
a guide bushing located between the guide portion and the guide knuckle.

19. The swirler inlet valve plate assembly of claim 18, further comprising a retaining ring inserted into a retaining ring slot of the base knuckle adjacent the base portion of the pivot pin.

* * * * *